May 19, 1959  J. BUXBAUM  2,887,288
DEVICE FOR POSITIONING WATER HOSE
Filed April 1, 1957
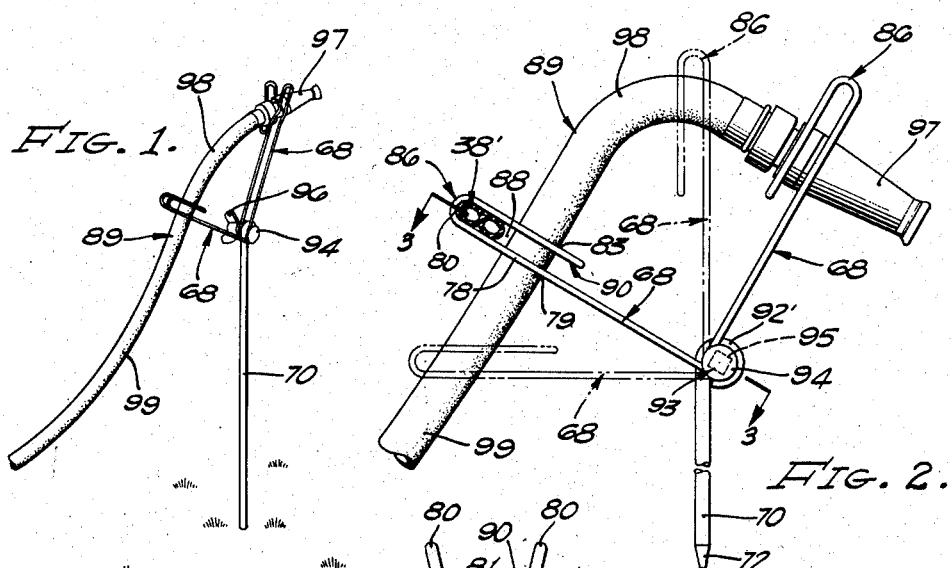
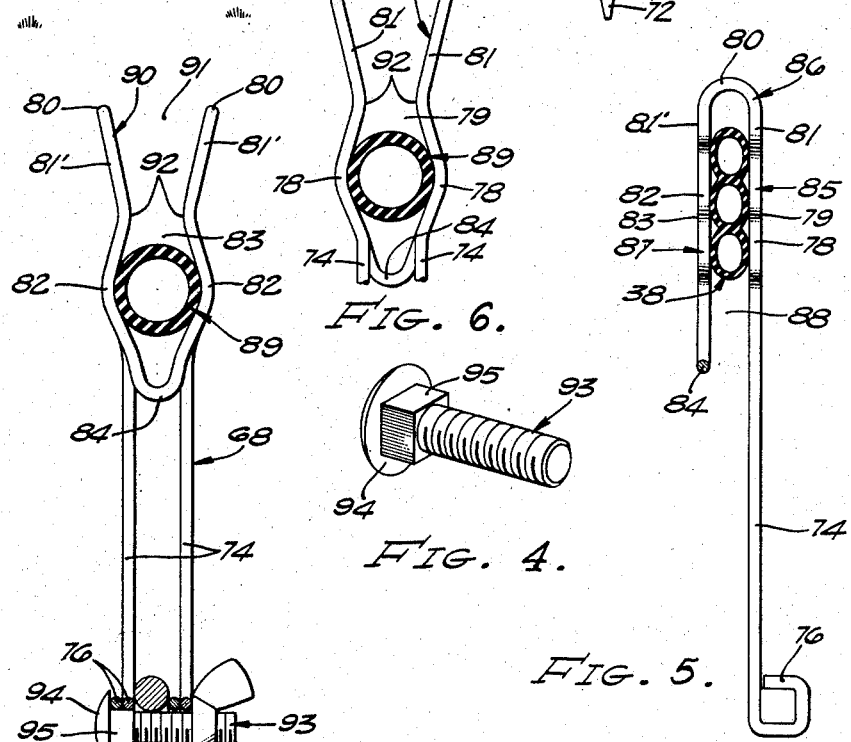
INVENTOR.
JOSEPH BUXBAUM
BY Philip Suthow
Max Gildin
ATTORNEY United States Patent Office 2,887,288
Patented May 19, 1959

2,887,288
DEVICE FOR POSITIONING WATER HOSE
Joseph Buxbaum, Los Angeles, Calif.
Application April 1, 1957, Serial No. 649,827
3 Claims. (Cl. 248—88)

This application is a continuation-in-part of my co-pending application Serial No. 558,715, now abandoned, filed January 12, 1956.

This invention relates to a device for adjusting the position of a flexible water hose and maintaining it in a preselected location so as to control the direction of the water streams ejected from the hose.

Commercially available flexible plastic water hoses have been developed containing a plurality of fine holes distributed in the surface thereof, so that by placing the hose upon the ground, fine streams of water are ejected from such holes for watering lawns, flowers, foliage and the like. Since such hoses are normally positioned on the ground, this makes it difficult to direct the water only to those areas which it is desired to water, resulting in a wastage of water and a wetting of those areas which do not require water and which it is desired not to wet. Thus, it is desirable, for example, while watering a lawn or flowers thereon, to control the direction of the water so that it does not also spray building walls or parked cars along the street, with resulting nuisance and wastage of water. Also, it often happens that one wishes to water a restricted area in the nature, for example, of a flower bed, without directing spray to adjacent areas.

The object of this invention is to provide an inexpensive device which can be attached preferably in removable manner to hoses of the above type as well as to conventional hoses, to adjust the position thereof and to anchor the hose so as to control the direction of water emitted and confine the water sprays substantially only to those areas desired to be watered. Another object is the provision of a device of the foregoing nature which is designed to support one or more hoses in different positions in the device. A particular object is the design of a device of the above type in which the position of the hose can be pivotally adjusted without repositioning the supporting pin of the device in the ground.

These and other objects are accomplished by my invention, which comprises a device in the form of a holder composed of at least one elongated pin for insertion into the ground, and a hose gripping element or holder connected to said pin, said element having a substantially U-shaped section forming a pair of legs, and being open at one end of said element for insertion of a hose into the holder, and being closed at an intermediate portion of said element. The aforementioned legs are formed by a pair of wires connected together in the form of a loop at said one end of said element and bent back at said intermediate portion of said element, said wires forming a second U-shaped portion in a plane perpendicular to said U-shaped section, and a bent-back portion. The above noted U-shaped section and U-shaped portion are each adapted to receive a water hose. According to a preferred embodiment, the adjacent wires of said U-shaped portion and of said bent-back portions are bent outwardly intermediate their ends forming an enlarged opening in said U-shaped portion and in said bent-back portion.

In preferred practice of the invention, the device includes a pair of the above described hose gripping elements each connected at the free ends of their wires to the supporting pin. Means are provided for pivoting said elements simultaneously on the supporting pin to maintain a predetermined angle between said elements.

By means of the above described construction, a hose gripping element or holder is provided which will receive and maintain a hose, e.g., of the flat type having a plurality of small holes therein, within one portion of the holder, preferably within the confined space formed within the above noted U-shaped section, and which is also designed to receive another hose, e.g., of the conventional round type having a nozzle at one end thereof, within another portion of the holder, preferably within the confined space formed between the adjacent wires of the above noted U-shaped portion and between the adjacent wires of the bent-back portion, or within the enlarged openings therein which are designed particularly to receive a round type of hose. In this manner the two hoses can be supported perpendicular to each other by the same hose gripping element.

According to the above noted preferred embodiment wherein a pair of hose gripping elements are pivotally connected to a supporting pin which is inserted into the ground, a hose of the conventional type can be supported in the U-shaped portion and in the bent-back portion of each of the two elements, in the plane of pivotal movement of these elements, and the hose or nozzle thereof can be directed at any angle upwardly or downwardly, and can be maintained in any desired position. Pivotal motion of the hose gripping elements on the pin is produced simply by raising or lowering such hose, and the device is constructed so that both hose gripping elements pivot simultaneously and maintain a substantially fixed angle therebetween to grip the hose securely at all times.

Due to flexibility of the holder or hose gripping element of the invention, and the springlike action of the wire gripping portions thereof, a hose can be slipped into position readily within the element and removed therefrom readily, and yet maintained securely in hose-gripping relation in the element while the hose is supported by the element. My versatile device enables the hose or hoses to be kept in any desired position and to be adjusted to spray a particular desired area, e.g., a flower bed, a portion of a lawn, and the like. If desired, a leg of the holder forming the above noted Ushaped section of the hose gripping element can be provided with a bent portion or shoulder, providing an area of restricted section between the legs of the U-shaped section adjacent the open end thereof to aid in maintaining the hose secure within the holder, and a larger sectional area adjacent the intermediate portion of the element formed by bending back the wires, in which portion the hose is positioned.

My hose gripping device is preferably constructed of metal, most desirably in the form of a bent wire. However, it is to be understood that my advice may be constructed of other materials such as plastics.

The invention will be more readily understood by reference to the description below of my invention taken in connection with the accompanying drawings wherein:

Fig. 1 shows another preferred embodiment of my device showing a conventional type hose gripped in position therein;

Fig. 2 is an enlarged view of the device of Fig. 1 showing different positions of the hose gripping elements;

Fig. 3 is a section taken on line 3—3 of Fig. 2;

Fig. 4 shows a detail of the pivot member of the device of Fig. 2;

Fig. 5 is a side elevation of one of the hose gripping elements of the device of Fig. 2, showing a flat form of hose gripped therein in a position different from the position of the hose shown in Fig. 2; and Fig. 6 is a partial back view of the holder as shown in Fig. 3.

In a preferred embodiment of my device shown in Figs. 1 to 6, there is shown a pair of holders 68 pivotally connected to the top of a pin 70 having a point 72 at its lower end for insertion into the ground as indicated in Fig. 2. Each of holders 68 is formed of a pair of wires 74 each bent at its free end into the shape of a square as indicated at 76 in Fig. 5. The wires 74 extend upwardly substantially parallel to each other for a distance and then bend outwardly at 78 (see Fig. 6) to form an enlarged opening 79. Wires 74 then continue upwardly and outwardly for a short distance as at 81, and are each bent back upon each other at 80 and then downwardly and inwardly toward each other at 81' (see Fig. 3), and then outwardly again at 82 to form an enlarged opening 83, the wires then being joined at the loop 84.

It is thus seen that the wire portions 78 and adjacent wire portions 74 and 81 on one side of holder 68 (see Fig. 5) form one leg 85 of the U-shaped section indicated at 86 on one side of the holder, the other leg 87 being formed by the wire portions 81' 82 and the loop 84, legs 85 and 87 being connected by the bends 80. This structure permits insertion of a hose such as 38 into the opening 88 of the U-shaped section 86 between the legs 85 and 87.

It will also be noted in Fig. 3 that a round conventional type hose 89 can be inserted in the generally U-shaped portion 90 of the holder 68, each leg of which is formed by wire portions 81' and 82, the legs being joined by the loop 84, the hose also being held between the adjacent wire portions 78, which are spaced rearwardly from the U-shaped portion 90. It will be seen that the U-shaped portion 90 of the holder 68 (Fig. 3) is at right angles to the U-shaped section 86 of the holder as seen in Fig. 5. Also, it will be noted that the wire portions 81 and the aligned wire portions 81' form an upwardly flared opening 91 into which the hose 89 can be inserted and the hose is then squeezed gently past the inner shoulders 92, each formed between the adjacent wire portions 81' and 82, into position in the enlarged opening 83 of the U-shaped portion 90 and the opposite aligned enlarged opening 79 of the same shape as the enlarged opening 83. Thus it will be seen that hose 89 will be anchored in position in the holder 68, as noted in Fig. 3, and is positioned in a plane perpendicular to the plane of hose 38 shown in Fig. 5.

The upper end of the supporting pin 70 is provided with a looped portion 92' (see Fig. 3) adapted to receive a pivot screw 93 having a head 94 and a square shoulder 95 adjacent the head. The dimensions of the square portion 76 at the lower ends of each of the wires 74 of the holder 68, are such that the square 76 is adapted to fit around the square shoulder 95 of the screw 93, as seen in Fig. 3, so that when screw 93 is turned, the holder 68 will pivot with the screw. The length of the shoulder 95 of the screw is such that a pair of holders 68 can be pivotally supported on the screw with the adjacent square portions 76 of one of the wires 74 of each of the holders mounted on the shoulder 95 and disposed between the head 94 of the screw and the loop 92' at the top of pin 70, as clearly seen in Fig. 3. As best seen in Fig. 2, the two holders 68 are mounted on screw 93 so that they are at about a 90° angle to each other. A butterfly nut 96 is provided for threadably engaging the screw 93 to maintain the assembly including holders 68 in a desired position as shown, for example, by the full line positions of these holders in Fig. 2.

It will be understood that the device can readily be designed so that more than two holders such as 68 can be supported in spaced pivotal relation on the screw by increasing the length of the shoulder 95. Also, instead of employing a square shoulder such as 95 on screw 93, I can design such shoulder of any polygonal shape, such as triangular or hexagonal, to readily support a plurality of holders at angles greater or less than 90° to each other.

As seen in Figs. 1 and 2, I can support the nozzle 97 of the hose 89 in one of the holders in a manner similar to that shown in Fig. 3, and I can likewise support an adjacent portion of the hose in the other holder 68 so as to form a bend 98 in the hose. Thus, in the position of the hose shown in Fig. 2, the nozzle 97 thereof will discharge water downwardly to wet a desired area, e.g., a flower bed. By manually manipulating the portion 99 of the hose extending just below the adjacent holder 68, e.g., by applying a moderate pull on the hose, the holders 68 can be pivoted counterclockwise about screw 63, viewing Fig. 2, to their dotted line position shown therein, with the same angle of about 90° maintained between the holders. In this position of the holders, the nozzle 93 will be directed upwardly as shown in Fig. 1, e.g., to spray a larger area located at a greater distance from the hose than in the case of the downwardly directed nozzle shown in Fig. 2. It will thus be seen that the hose 89 can be manipulated by a gentle pulling or pushing force applied to portion 99 of the hose to raise or lower the nozzle to any desired position.

Simultaneously, if desired, the design of the holders 68 permits positioning of a hose such as 38' in the holder, the latter being directed perpendicular to the direction or plane of hose 89, as illustrated in Fig. 2. In this respect the hose 38' is positioned in the U-shaped area 88 of the holder closely adjacent the upper wire bends 80 of the holder, while the hose 89 is positioned at right angles to hose 38', and disposed adjacent thereto in the enlarged space 83 formed in U-shaped portion 90 and in the adjacent aligned enlarged space 79 formed by wire portion 78. The versatility of my holder device is readily apparent in that the flat hose 38' may be watering an extensive area such as a lawn, while the hose 89 is at the same time employed to spray a different location of confined area, such as a flower bed.

It is seen from the above that I have provided a versatile, simple and inexpensive holder for adjusting the position of a water hose and anchoring same. My holder permits one or more hoses to be adjusted and positioned most efficiently with minimum wastage of water, while at the same time avoiding the nuisance and disadvantage of spraying areas which it is not desired to water.

While I have described a particular embodiment of my invention for the purpose of illustration, it should be understood that various modifications and adaptations thereof may be made within the spirit of the invention as set forth in the appended claims.

I claim:

1. A water hose positioning and anchoring device comprising a plurality of separate hose clips, a ground penetrating pin, each of said clips being formed of a wire rod including a reversely bent portion forming a resilient hose receiving and gripping means at one end and having a loop at the other end of regular polygon contour, a loop on one end of said pin, and a clamping means adapted to pass through all said loops and frictionally clamp said clips and pin in adjustable angular relationship, said clamping means having at least a portion thereof formed with a regular polygonal contour mating with said contour of said clip loops, whereby the angular relationship of said clips may be selected and adjusted as a unit relative to said pin without disturbing the selected angular relationship of said clips relative to each other.

2. A device as set forth in claim 1, wherein said hose clips each comprise two substantially parallel leg portions terminating in U-shaped, reverse bends, arm portions extending from said U-shaped bends and substantially paralleling said leg portions for a substantial length thereof, and the ends of said arm portions being joined together in the form of a U-shaped loop, the portion of the clip including said arm portion forming said resilient hose receiving and gripping means and the ends of said leg portions remote from said arm portions having said loop of regular polygon contour.

3. A device as set forth in claim 1, wherein there are two hose clips, and the regular polygon contour is a square, whereby the two clips may be set relative to one another at angles of 90° and 180°, as desired.

References Cited in the file of this patent

UNITED STATES PATENTS

| | | |
|---|---|---|
| 1,040,645 | Davis | Oct. 8, 1912 |
| 1,058,090 | Nelson | Apr. 8, 1913 |
| 2,349,505 | Lohne | May 23, 1944 |
| 2,544,986 | Dyer | Mar. 13, 1951 |